United States Patent [19]
Romano

[11] Patent Number: 5,425,434
[45] Date of Patent: Jun. 20, 1995

[54] BICYCLE BRAKE WITH TWO PIVOT PINS
[75] Inventor: Antonio Romano, Padova, Italy
[73] Assignee: Campagnolo S.r.l., Vicenza, Italy
[21] Appl. No.: 119,584
[22] Filed: Sep. 13, 1993
[30] Foreign Application Priority Data
   Sep. 11, 1992 [IT] Italy .................................. T0920758
[51] Int. Cl.6 ............................. B62L 1/00; B62L 1/12
[52] U.S. Cl. .................................. 188/24.19; 188/24.15
[58] Field of Search ............... 188/24.14, 24.15, 24.19,
          188/20, 72.7, 72.8, 72.9, 196 F, 196 V, 196 M,
          216, 24.11, 24.12

[56] References Cited
U.S. PATENT DOCUMENTS

| | | | |
|---|---|---|---|
| 4,014,408 | 3/1977 | Armstrong | 188/24.15 |
| 4,290,507 | 9/1981 | Brown | 188/72.9 X |
| 4,482,033 | 11/1984 | Yoshigai | 188/24.22 X |
| 4,938,318 | 7/1990 | Ishibashi | 188/24.19 |
| 5,188,200 | 2/1993 | Modolo | 188/24.11 |

FOREIGN PATENT DOCUMENTS 22761 11/1988 Italy .
2029531 3/1980 United Kingdom ............. 188/24.19

Primary Examiner—Josie A. Ballato
Attorney, Agent, or Firm—Sughrue, Mion, Zinn, Macpeak & Seas

[57] ABSTRACT

A brake for bicycles includes a pair of levers each having a holding arm for a brake shoe. The first lever is articulated about a first pivot pin secured to the bicycle frame. A linking element is secured to the pivot pin and carries a second pivot pin parallel to the first pivot pin for articulating the second lever. A spring tends to hold the arms of the two levers apart and a device is provided for adjusting the spacing of the arms of the levers. This adjustment device includes a rocking member articulated about the second pivot pin and engaging one of the pair of levers and an adjustable threaded member on the other of the pair of levers.

10 Claims, 3 Drawing Sheets

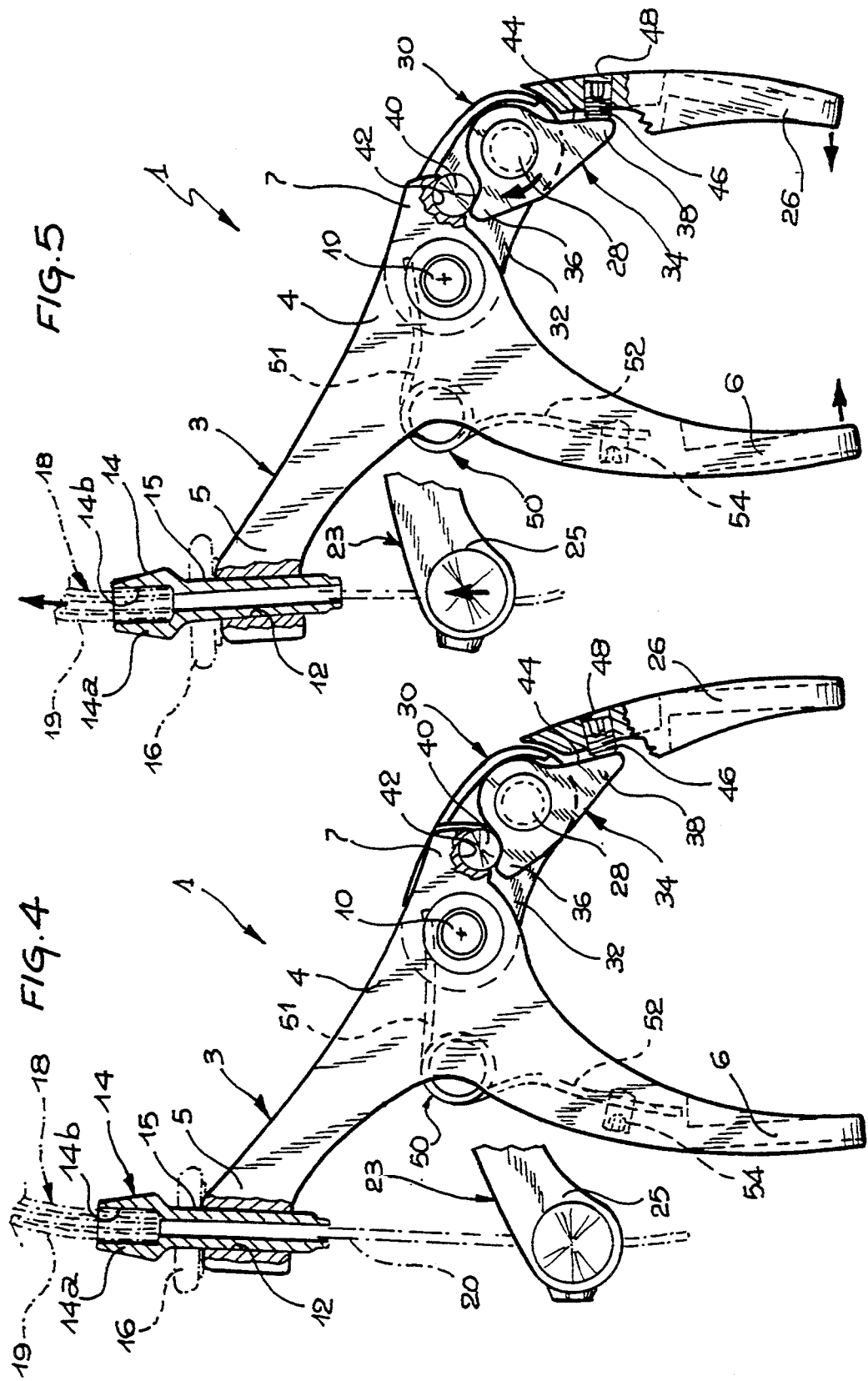

BICYCLE BRAKE WITH TWO PIVOT PINS

BACKGROUND OF THE INVENTION

This invention relates to a brake for bicycles, being of a type which comprises:

first and second swingable levers, each provided with an articulation portion from which a holding arm for a brake shoe and an actuation end extend, the levers being arranged to crossover and the first lever being pivoted with its articulation portion about a first pivot pin secured to the bicycle frame;

a linking element secured to the first pivot pin and carrying a second pivot pin parallel to the first for articulating the second lever;

a spring bias means tending to told the arms of the two levers apart; and a device for adjusting the spacing of the arms of the two levers, which adjustment device includes a drive means from the two levers such that, upon application of a force directed to bring the arm of the second lever closer to the arm of the first, the arm of the first lever will move toward the arm of the second.

A brake for bicycles of the kind outlined above is known from Italian Patent Application No. 22761-A/88, for example.

SUMMARY OF THE INVENTION

It is the object of this invention to provide a brake for bicycles as indicated in the introductory part of this specification, which can perform more effectively.

This object is achieved in that the adjustment device comprises a rocking member articulated about the second pivot pin.

BRIEF DESCRIPTION OF THE DRAWINGS

Further features and adavantages of this invention will become apparent from the following detailed description, given by way of example and not of limitation with reference to the accompanying drawings, in which:

FIG. 4 is a front elevation view cutaway along arrows IV—IV in FIG. 2; and

FIG. 5 is a view similar to FIG. 4 but at a different stage of the inventive brake operation.

DETAILED DESCRIPTION OF THE INVENTION

Figure 1:
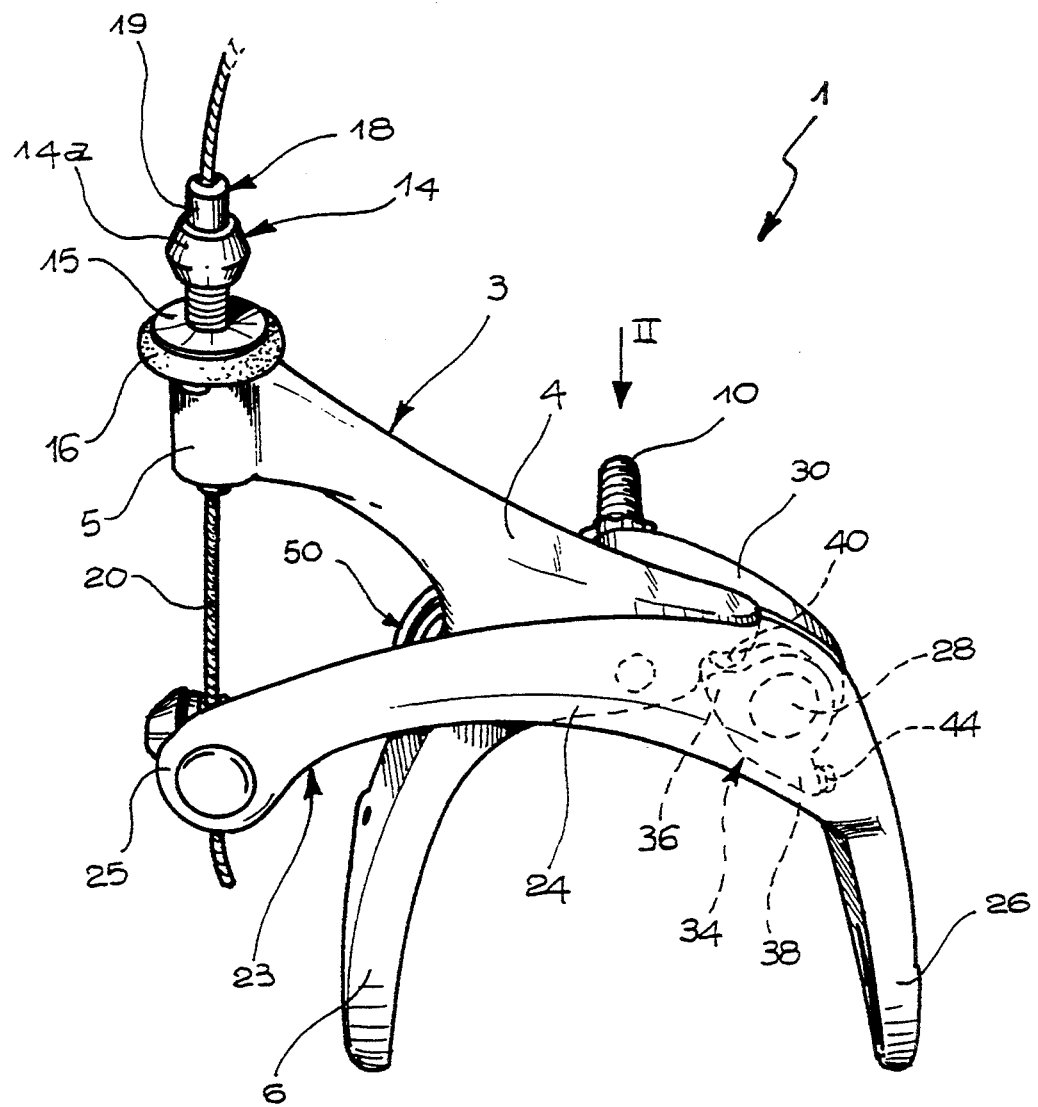
FIG. 1 is a front perspective view of a brake according to the invention.
Figure 2:
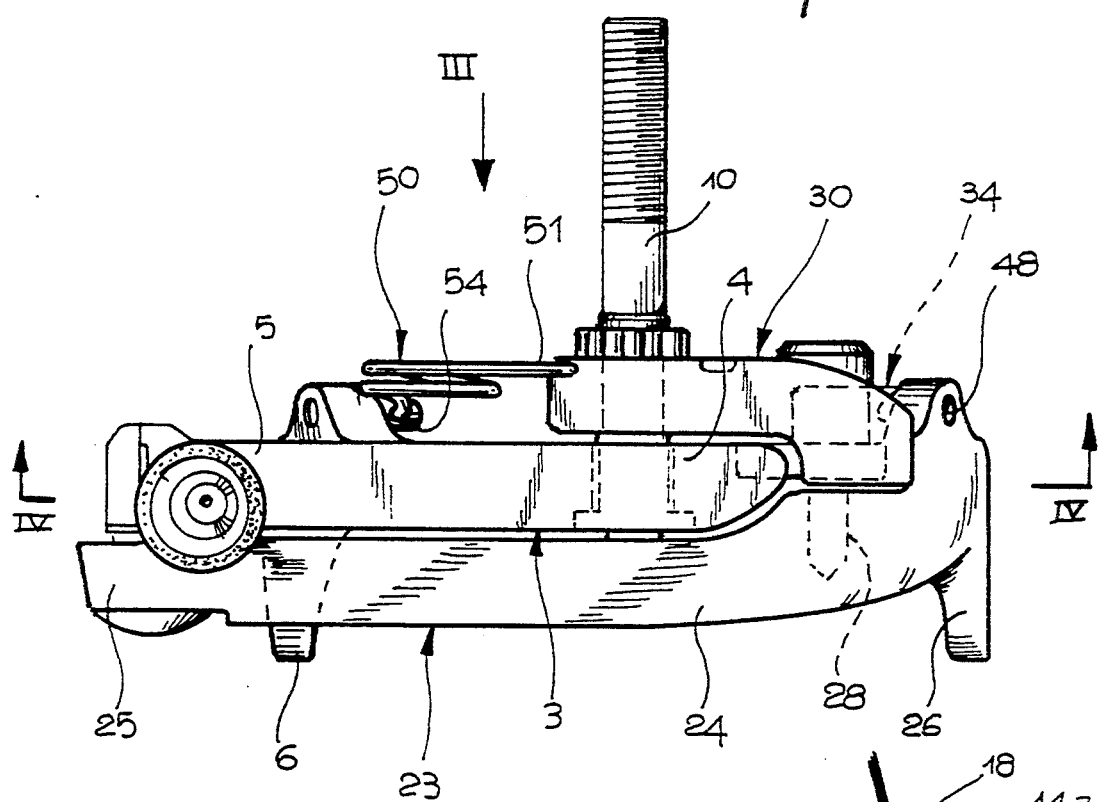
FIG. 2 is an elevation view in the direction of arrow II in FIG. 1.

With reference to the drawing views, a brake for bicycles is generally denoted by the reference numeral 1 and has two swingable levers 3 and 23.

The lever 3 is substantially Y-shaped and has an articulation mid-portion 4 through-penetrated by a pivot pin 10 extending orthogonally to the plane of the lever 3 and being attached fixedly to the bicycle, e.g. to a portion of its frame (not shown in the drawings). From the articulation portion 4, there extends an actuation end 5 and an arm 6 adapted to carry a brake shoe, known per se and not shown in the drawings. A projecting portion 7, serving a function to be explained, also extends from the portion 4 in a radial direction from the pin 10 toward the second pin 28, on the remote side from the end 5 and the arm 6.

The lever 23 is substantially C-shaped and also has an articulation mid-portion 24 from which an actuation end 25 and arm 26 extend in substantially opposite directions, said arm 26 being arranged to carry a brake shoe similar to the one associated with the arm 6 and oppositely located therefrom.

The levers 3 and 23 are arranged to cross each other such that the arms 6 and 26 will extend substantially parallel and adjacent to each other and the actuation ends 5 and 25 lie adjacent to each other in a yoke configuration.

The lever 23 is articulated with its portion 24 about a pivot pin 28, separate from and parallel to the pivot pin 10 said pivot pin 28 being carried on a connecting rod member 30 fast with the pin 10.

The levers 3 and 23 can be swung about their respective pivots 10 and 28 to change the relative positions of the actuation ends 5 and 25 with the intermediary of a conventional Bowden wire 18. Specifically, the end 5 of the first lever 3 is provided with a device for adjusting the Bowden wire 18 tension. This device comprises a hollow body 14, substantially cylindrical in shaper which fits partway into a hole 12 drilled through the end 5 and includes a threaded shank 15 whose threadway is engaged by an adjustment nut 16 abutting the end 5 of the lever 3 at the location of the hole 12. The element 14 has an enlarged diameter portion 14a formed with a socket 14b on the bottom of which one end 19 of the Bowden wire 18 sleeve is arranged to abut, whilst the core wire 20 is passed axially through the hollow element 14 and is secured to the end 25 of the lever 23 by a conventional locking device.

Figure 3:
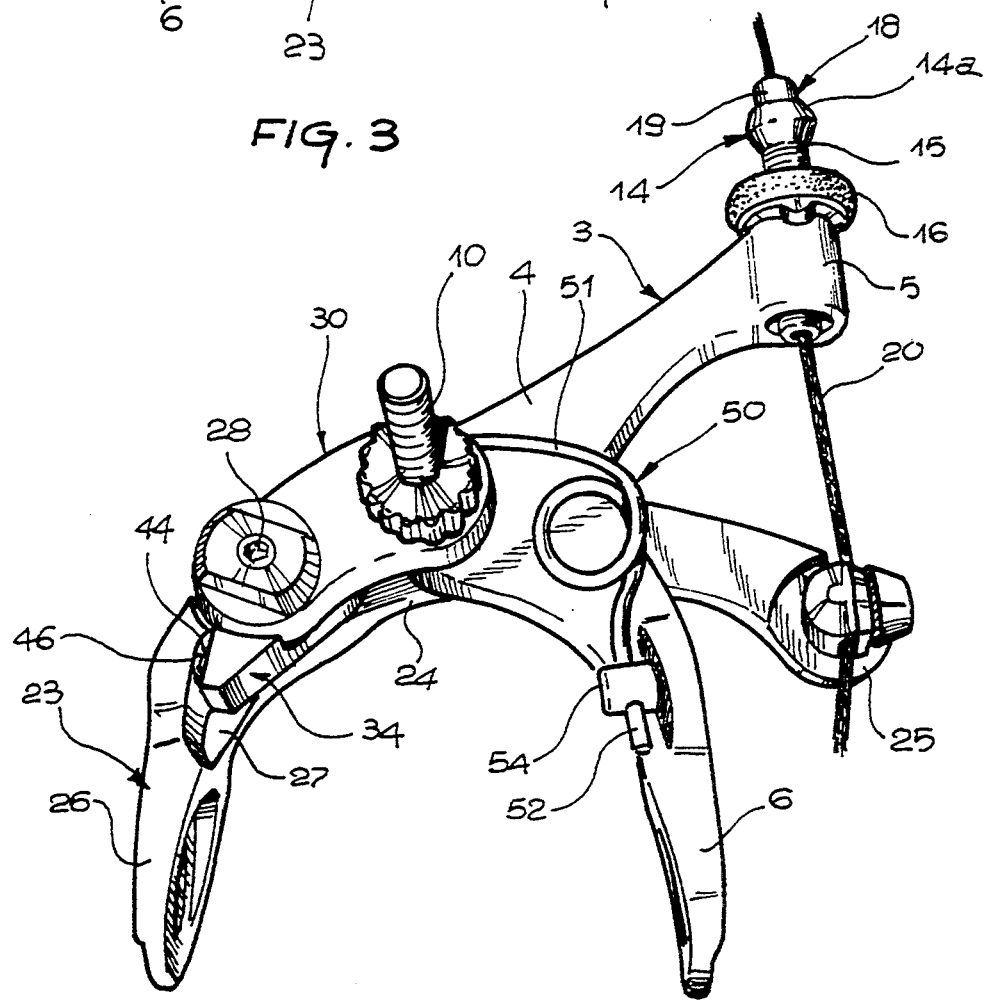
FIG. 3 is a rear perspective view in the direction of arrow III in FIG. 2.

The linking element 30 has a portion 32 of hollow construction which confronts a corresponding hollow portion 27 of the lever 23 (see FIG. 3) so as to provide a space between the element 30 and the lever 23 whereinto a rocking member 34, also articulated about the pivot pin 28, is accommodated.

The member 34 has a pair of lugs 36 and 38 extending from opposite sides with respect to the pin 28. The lug 36 is cam-shaped and arranged to co-operate in sliding contact with an active surface of contact on the projecting portion of the lever 3. The active surface may be a part of the outer surface of a ball or roller 40 which may be formed from a wear-resistant material and is received in a corresponding seat 42 provided in the projecting portion 7 of the lever 3.

The lug 38 has an abutment surface 44 facing the arm 26 of the lever 23 and being arranged to co-operate with one end of an Allen screw 46 engaged in a threaded hole 48 drilled across the arm 26.

A bias spring 50 of the wire type acts to hold apart the arms 6 and 26 of the levers 3 and 23. The spring 50 has two legs which extend from a mid-portion wound into a coil, with a first one 51 of the legs engaged in a mating recess of the element 30 and the other leg 52 engaged in a through hole provided in a rotatable cylinder coaxial with an Allen screw 54 which engages in a threaded hole provided across the arm 6.

In operation, and with reference to FIGS. 4 and 5, while the Bowden wire 18 is in a slackened condition, the arms 6 and 26 are held apart by the action of the spring 50. In that position, the Allen screw 46 can be manipulated to adjust the mutual spacing of the arms 6 and 26, and hence of the brake shoes associated there-with. In addition, the spring 50 tension can be adjusted by means of the screw 54.

By applying a pull to the Bowden wire 18, or more precisely by tensioning its core wire 20 within the sleeve 19, the actuation ends 5 and 25 of the levers 3 and 23 are moved toward each other against the bias force of the spring 50 so as to bring the arms 6 and 26 closer together. In particular, the end 25 of the lever 23 will move upwards (as viewed in FIG. 5) and drag the arm 26 leftwards. Along with the arm 26, the screw 46 will be shifted to push against the abutment surface 44 of the lug 38, thereby causing the rocking member 34 and the lug 36 to rotate about the pin 28. The displacement of the lug 36 causes, through the ball 40, the portion 7 of the lever 3 to move upwards, thereby contributing to the lever 3 swing movement that brings the arm 6 closer to the arm 26 of the lever 23, the resultant action adding to the thrust exerted by the Bowden wire 18 sleeve on the actuation end 5.

Understandably, within this inventive principle, the embodiments and constructional details may vary considerably without departing from the scope of this invention.

I claim:

1. A brake for bicycles, being of a type which comprises:

first and second swingable levers, each provided with an articulation portion from which a holding arm for a brake shoe and an actuation end extend, the levers being arranged to cross over and the first lever being pivoted with its articulation portion about a first pivot pin secured to a bicycle frame;

a linking element secured to the first pivot pin and carrying a second pivot pin parallel to the first for articulating the second lever;

a spring bias means tending to hold the arms of the two levers apart; and an adjustment device for adjusting the spacing of the arms of the two levers and including drive means between the two levers such that upon application of a force directed to bring the arm of the second lever closer to the arm of the first lever, the arm of the first lever will move toward the arm of the second lever;

wherein said adjustment device comprises a rocking member articulated about said second pivot pin and includes a pair of striker lugs which extend in opposite directions from said second pivot pin, said lugs having respective abutment surfaces on sides of said lugs facing in a common direction for engagement with the first and second levers respectively.

2. A brake according to claim 1, wherein one of the striker lugs is adapted to co-operate with the second lever and has an abutment surface facing the second lever, with an adjustment screw member interposed therebetween for adjusting the gap between said abutment surface and the second lever.

3. A brake according to claim 2, wherein the adjustment screw member is an Allen screw engaged in a threaded hole through the second lever.

4. A brake according to claim 1, wherein one of the striker lugs is adapted to cooperate with the first lever and is cam-shaped and adapted to cooperate in sliding contact with a portion of the first lever proximate to the articulation portion thereof.

5. A brake according to claim 4, wherein said portion of the first lever projects radially from the first pivot pin toward the second pivot pin and has an active surface of contact with the cam-shaped lug.

6. A brake according to claim 5, wherein said active surface is the outer surface of a ball engaging in a corresponding seat in the radially projecting portion of the first lever.

7. A brake according to claim 5, wherein said active surface is the outer surface of a roller engaging in a corresponding seat in the radially projecting portion of the first lever.

8. A brake according to claim 1, wherein the spring bias means comprises a wire spring having a first end engaged with the linking member and a second end connected to the first lever.

9. A brake according to claim 8, wherein the tension of the wire spring is adjustable.

10. A brake according to claim 9, wherein the second end of the wire spring being movable by an adjustment screw which engages in a threaded hole through the first lever.

* * * * *